United States Patent
Edwards et al.

(10) Patent No.: US 7,926,481 B2
(45) Date of Patent: Apr. 19, 2011

(54) SOLAR WATER VAPOR EJECTOR

(76) Inventors: Oliver J. Edwards, Ocoee, FL (US);
Robert J. Horstmeyer, Palo Alto, CA (US)

(*) Notice: Subject to any disclaimer, the term of this patent is extended or adjusted under 35 U.S.C. 154(b) by 98 days.

(21) Appl. No.: 11/881,085

(22) Filed: Jul. 25, 2007

(65) Prior Publication Data

US 2009/0025711 A1    Jan. 29, 2009

(51) Int. Cl.
*F24J 2/46* (2006.01)
*F24J 2/50* (2006.01)

(52) U.S. Cl. .......................... 126/704; 126/708

(58) Field of Classification Search .................. 126/704, 126/708, 687; 55/385.4
See application file for complete search history.

(56) References Cited

U.S. PATENT DOCUMENTS

| | | | | |
|---|---|---|---|---|
| 2,462,952 A | * | 3/1949 | Dunkak | 96/146 |
| 3,593,498 A | * | 7/1971 | Semon | 96/141 |
| 3,771,276 A | * | 11/1973 | Stewart et al. | 52/172 |
| 3,974,823 A | * | 8/1976 | Patil | 126/658 |
| 3,990,429 A | * | 11/1976 | Mazzoni et al. | 126/712 |
| 3,995,614 A | * | 12/1976 | Cerra et al. | 126/709 |
| 3,999,536 A | * | 12/1976 | Bauer et al. | 126/710 |
| 4,202,320 A | * | 5/1980 | Bowen | 126/660 |
| 4,202,322 A | * | 5/1980 | Delgado et al. | 126/574 |
| 4,217,885 A | * | 8/1980 | Bowles | 126/672 |
| 4,235,221 A | * | 11/1980 | Murphy | 126/567 |
| 4,242,112 A | * | 12/1980 | Jebens | 96/113 |
| 4,345,587 A | * | 8/1982 | Carvalho | 126/662 |
| 4,414,693 A | * | 11/1983 | Brody | 2/435 |
| 4,581,047 A | * | 4/1986 | Larsson | 96/131 |
| 4,633,032 A | * | 12/1986 | Oido et al. | 136/251 |
| 4,803,972 A | * | 2/1989 | Janson | 126/710 |
| 7,178,355 B2 | * | 2/2007 | Moffitt | 62/271 |
| 2008/0178922 A1 | * | 7/2008 | Gibson et al. | 136/244 |

FOREIGN PATENT DOCUMENTS

FR        2462670 A  *  3/1981

OTHER PUBLICATIONS

PCT search report and written opinion—PCT/US2008/68690—dated Oct. 2, 2008.

* cited by examiner

*Primary Examiner* — Henry Yuen
*Assistant Examiner* — Frances Kamps
(74) *Attorney, Agent, or Firm* — Tue Nguyen

(57) ABSTRACT

A water vapor ejector comprises a desiccant disposed in a communication path to a green house enclosure. In the day time and under sunlight exposure, the green house enclosure heats up, which dries the desiccant and generates a flow to the outside ambient through a pressure difference. The moisture trapped in the desiccant is then released to the outside ambient. In the night time, the green house enclosure cools, which generates a flow to the inside of the enclosure. The desiccant traps the moisture within the flow, ensuring a moisture-free enclosure. The cycle re-starts in the next morning when the enclosure heats up. The diurnal cycle removes the water vapor present in the enclosure and delivered to the exterior of the enclosure.

20 Claims, 2 Drawing Sheets

SOLAR WATER VAPOR EJECTOR

BACKGROUND

One of the critical problems with transparent enclosures for solar power harvesters is the presence of water vapor in the enclosed volume. Upon cooling at night the water vapor condenses first on the air-cooled transparent window, forming droplets and "fogging" the inner window surface The next day the solar collector is covered with a diffusing sheet of water droplets and the collector forms no image. In cold climates this further freezes to form frost on the window: the rising sun illuminates a diffusing, highly reflective sheet over the solar collector, and the frost remains substantially unheated, perhaps throughout the day unless the air warms enough to "burn it off".

Thus the condensation of water on the interior of the transparent cover of the collector effectively shuts down power harvesting, and even shuts down the ability of the window to clear itself in cold climates: the windows may remain frosted throughout the day with zero net power generated by the solar power harvester system.

This is a common problem with solar collectors. Typically the problem is ignored, and the user simply waits for the heat of the sun to melt the frost and to evaporate the condensed water. At minimum a significant portion of the power-generating capability is lost at the start of the day; in colder climates the frosted layer on the air-chilled window may not abate during the day, and thus the condensed water vapor prevents the system from operating at all.

U.S. Pat. No. 4,803,972 teaches the use of a hermetically sealed chamber with the chamber allowed to expand and contract according to the pressure. This has the problem of scale: the chamber pressure between a freezing night and a solar-heated 50° C. the next noon corresponds to an 18% change in chamber volume: a generally impractical movement of the face of the transparent cover.

A method for defogging the lenses of goggles is described in U.S. Pat. No. 4,414,693, which teaches the use of desiccator elements built into the goggles housing; such a desiccator element becomes useless when it is saturated with water.

U.S. Pat. No. 7,178,355 and its many predecessors teach the use of a desiccant wheel as a method for continuously recharging a desiccator element by cyclically passing the saturated desiccant element through a heated zone to drive off the adsorbed water, then through an exposure zone to adsorb water.

Solar power harvesters heretofore known suffer from a number of disadvantages:

(a) They suffer condensation of water vapor present in the interior of the transparent housing, as the air cools after sundown.

(b) The presence of water condensed on the interior of the transparent window causes sunlight to be diffused and scattered back away from the absorptive interior, and prevents focusing of the sunlight into a focal spot.

(c) The window becomes rapidly soiled: condensed water acts as a sink for airborne dust, "pumping" the airborne dust onto the inner window surface; the window accumulates a sun-blocking layer of dirt which cannot be removed except by system disassembly.

(d) After nights when the ambient temperature drops below freezing, frost on the window interior is highly reflective of morning sunlight, and little energy is transmitted to the chamber interior; that transmitted light is scattered rather than collimated for the use of concentrating optics; and the frost will not dissipate until the ambient air heats up enough to melt the frost and then even more to evaporate the resultant liquid condensation.

(e) Thus condensed water vapor is very costly to the average annual yield of useful power, and practicable methods have not been previously taught for excluding water vapor from the interior of the solar harvester housing.

SUMMARY OF THE INVENTION

In accordance with the present invention a water vapor ejector comprises an exit aperture in the envelope of a sealed enclosure; a dust filter covering the exit aperture; a tube open to and sealed to the perimeter of the aperture; an optically black desiccant vessel terminating the other end of the tube and containing reversible desiccant material, and an opening from the volume of the desiccant vessel to the sealed enclosure. The desiccant vessel is absorptive to the solar spectrum, and is positioned within the enclosure to receive a maximum of sunlight; in the example of a parabolic trough or equivalent solar collector structure: at or near the focus of the parabola. In a diurnal cycle, the water vapor present in the enclosure is removed and delivered to the exterior of the enclosure.

Several objects and advantages of the present invention include:

(a) to provide a water vapor ejector which removes water vapor from the enclosed volume surrounding a solar irradiance harvester, and maintains the humidity low enough top prevent condensation on the interior of transparent surfaces.

(b) to provide a water vapor ejector with no moving parts (c) to provide a water vapor ejector which operates on a daily cycle without use of external power or external control functions.

(d) to provide a water vapor ejector which has a low construction and installation cost, and minimal required maintenance.

Other features and advantages of the present invention will be apparent to persons skilled in the art from the following detailed description of a preferred embodiment accompanied by the attached drawings.

DRAWINGS

In the drawings, closely related figures have the same number.

Figure 1:
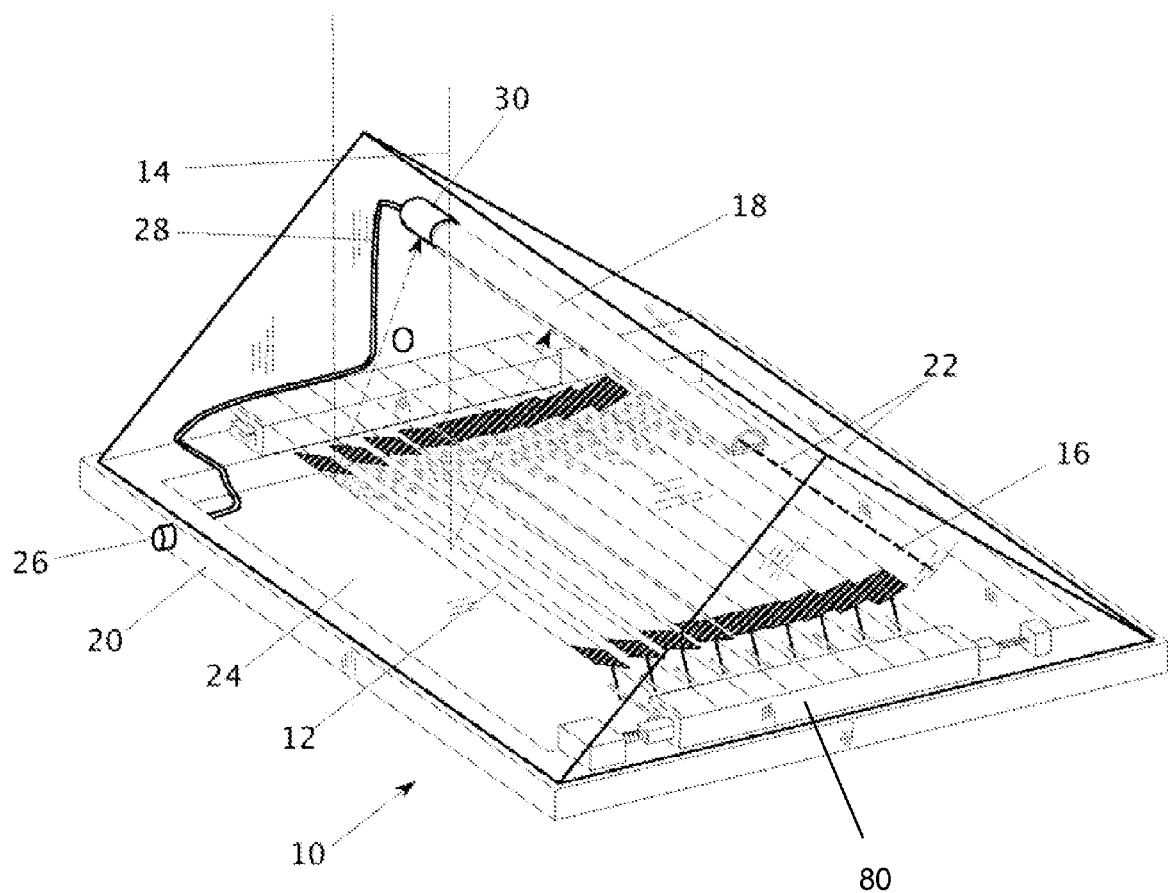
FIG. 1 shows a perspective view of an exemplar solar power harvester system with an installed water vapor ejector.

REFERENCE NUMERALS 10 dust-tight enclosure
12 reflective slats
14 incident sunlight
16 common solar focus
18 solar converter
20 base of enclosure
22 transparent window(s)
24 sealed bottom covering
26 dust filter
28 tubing; tube
30 desiccator chamber
32 desiccator material
34 connecting aperture
36 heating sunlight

DETAILED DESCRIPTION OF THE INVENTION

Referring first to FIG. 1, reference numeral 10 generally designates a dust-tight enclosure for a solar power harvester. A taught in prior art, the solar power harvester may be a planar array of photovoltaic cells or heat-absorbing coolant pipes; it may be a concentrating collector such as a parabolic dish or parabolic trough; or as illustrated here: a Fresnel collector comprised of a planar array of reflective slats 12 positioned to each reflect sunlight 14 onto a common focus 16. The sunlight impinges on a solar converter 18 at the common focus 16 which converts the solar irradiation 14 into useful power by photovoltaic cells (PV) which generate electricity and/or blackened pipes which heat an internal working fluid. In an embodiment, the solar power harvester further comprises a heliostat 80 to focus the solar irradiance.

The dust-tight enclosure 10 comprises a base 20, upper transparent window or windows 22, and a sealed bottom covering 24. The window is typically a glass which is highly transparent to the solar spectrum and typically is anti-reflection coated. The sealed bottom member might for example be a metal sheet, sealed at its periphery to the base 20.

A dust filter 26 covers an aperture through the base 20, and is connected to an open end of a tube 28. The other end of tube 28 is connected to the volume of a desiccator chamber 30; the desiccator chamber 30 is open at its other end to the volume of the dust-tight enclosure 10.

Figure 2:
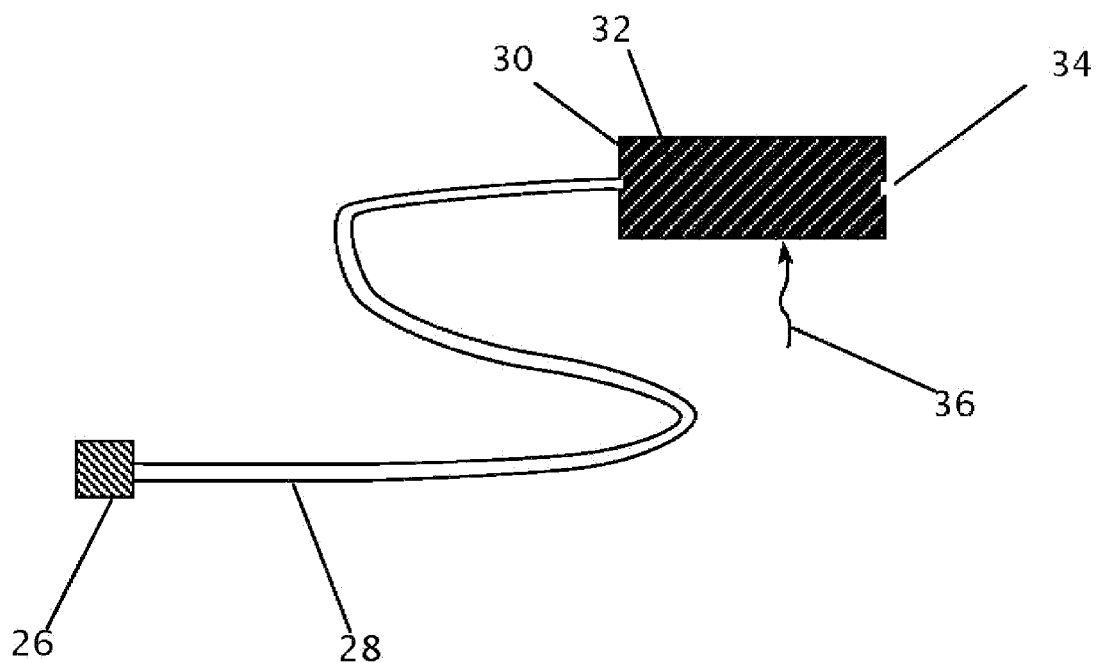
FIG. 2 shows a view of an exemplary water vapor ejector constructed according to the present invention.

The water vapor ejector subsystem is shown separately in FIG. 2. The desiccator chamber 30 contains desiccator material 32, which is of a reversible form. That is to say: it adsorbs water vapor below a particular temperature and above its regeneration temperature the water vapor is driven from the desiccant matrix. There are many prior-art desiccant materials and forms, such as:

Silica Gel
Lithium Chloride (Liquid or Dry)
Lithium Bromide
Activated Alumina
Titanium Silicate
Molecular Sieve A typical activation temperature would be 100° C., although desiccants may be regenerated between 50° C. and several hundred ° C., for adsorptive use at lower than the regeneration temperature.

The desiccator chamber 30 is blackened and designed to absorb the solar spectrum, and may usefully have adjacent reflective elements to further concentrate the sun light onto the heated desiccant chamber. A small aperture 34 connects the volume of the desiccator chamber 30 with the volume of the dust-tight enclosure.

During the day the sunlight 36 heats the desiccant chamber. Depending on the form and design of the solar harvester, the sun may be direct (one sun) or it may be concentrated into 40 or more suns. In the stagnant air of the dust-tight enclosure and particular with adjacent reflectors to concentrate additional light, the desiccator chamber 30 might typically reach 50° C. to 90° C. during the day. At the focal line of a concentrator such as illustrated in FIG. 1, the desiccator chamber 30 might typically reach 80° C. to 300° C. during the day.

As the enclosure heats up during the morning, the air expands, increasing the interior pressure, and flows slowly out though the desiccator chamber, driving out the moisture trapped, e.g. desorbed, from the heated desiccant 32.

In the afternoon, the apparatus begins to cool. As the temperature of the desiccant drops it becomes strongly absorbing or adsorbing. As the temperature of the inside air begins to cool, the interior pressure drops, and it draws in air from the outside, which flows in through the regenerated desiccant. The water vapor is removed from the outside air and trapped (e.g. by absorption or adsorption) in the desiccant as it is drawn into the volume of the sealed enclosure. By the coldest time of the night the chamber is filled with desiccated air, and condensation is avoided at this low humidity.

The next morning the process begins again: the morning sun heats the desiccant and drives off the trapped moisture, while expelling it on the expanding air from the heating enclosure.

Thus the water vapor is blocked from entering the dust-tight enclosure in the evening by absorption or adsorption in the desiccant, and is expelled into the environment by morning heating.

A dust filter 26 covers the outside end of the connecting tube to allow the system to "breathe" without admitting dust particles. This would be the only element of the system which might require attention from the user; depending on the design of the filter and the location, cleaning the filter annually or every few years may be desirable.

In another embodiment the solar power harvester might comprise a 2-dimensional concentrator, such as a paraboloid. If a single large paraboloid concentrator, the desiccant vessel might usefully be placed near the concentrated solar focus. If the concentrator comprises a plurality of smaller parallel concentrators, one might be dedicated exclusively to heating the desiccant vessel.

Figure 3:
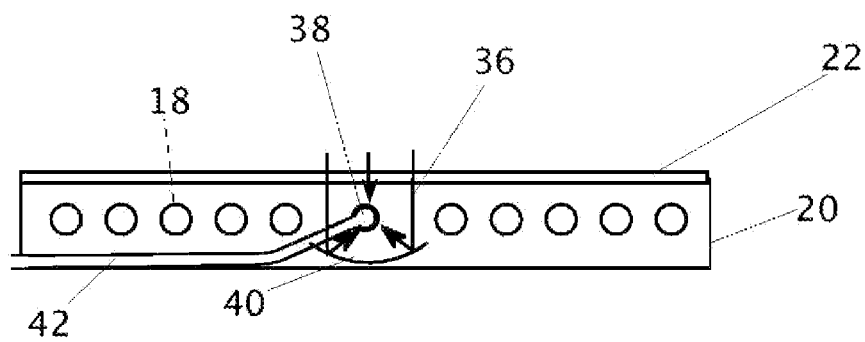
FIG. 3 shows another embodiment of a solar power harvester system with an installed water vapor ejector.

In yet another embodiment the solar power harvester does not include means for concentrating sunlight, but is a typically planar "one-sun" system such as is common in dwelling roof-top installations. In such an installation as shown in FIG. 3, planar photovoltaic cells or fluid pipes 18 are enclosed by a housing having a base 20 and transparent upper window 22. The water vapor ejector 38 has its own optics 40 for concentrating sunlight. The optics 40 might be refractive or more generally reflective walls used to increase the irradiance 36 on the desiccant vessel; these reflective walls might be a section of a sphere, or a section of circular trough as shown in the figure, or with diurnal east-west tracking: a parabolic trough or 2-dimensional concentrator. As above, the concentrated sunlight serves to heat the desiccant vessel to drive off water adsorbed during the previous night's cooling cycle through the breathing tube 42 connected to the atmosphere.

What is claimed is:

1. A liquid vapor ejector system comprising:
   a green-house enclosure subjected to a change in sunlight exposure;
   a solar concentrator for focusing sunlight onto a solar converter;
   a tube having a first end open to a vicinity of a focus of the solar concentrator and a second end open to an exterior of the enclosure;
   a desiccant disposed in the enclosure with direct contact to the air in the enclosure and disposed at the first end of the tube so that external air passes through the desiccant before entering the enclosure, the desiccant positioned at a vicinity of a focus of the solar concentrator as to be heated by the concentrated sunlight,
      wherein the desiccant directly traps liquid vapor within the enclosure, and
      wherein the desiccant traps liquid vapor from the air entering the enclosure and releases trapped liquid vapor to the exterior of the enclosure in response to the change in sunlight exposure.

2. A system as in claim 1 wherein the desiccant comprises silica gel, lithium chloride, lithium bromide, activated alumina, titanium silicate, or molecular sieve.

3. A system as in claim 1 further comprising a filter disposed in the communication path of the desiccant with the interior or exterior of the enclosure.

4. A system as in claim 1
wherein the desiccant is disposed to experience temperature changes in response to changes in sunlight exposure, and
wherein the desiccant traps liquid vapor from the air entering the enclosure and releases trapped liquid vapor to the exterior of the enclosure in response to the change in desiccant temperature.

5. A system as in claim 1
wherein a pressure difference between the interior and the exterior of the enclosure controls the flow to or from the enclosure through the desiccant, and
wherein the pressure difference is generated by the changes in temperature of the interior air in response to sunlight exposure.

6. A system as in claim 1 wherein when the temperature inside the enclosure rises, there is a flow from the interior of the enclosure to the exterior of the enclosure through the heated desiccant and the heated desiccant releases liquid vapor to the exterior of the enclosure.

7. A system as in claim 1 wherein when the temperature inside the enclosure drops, there is a flow from the exterior of the enclosure to the interior of the enclosure through the cooled desiccant and the desiccant collects liquid vapor from air entering from the exterior of the enclosure.

8. A system as in claim 1 wherein the enclosure's temperature and the desiccant's temperature increase during day time with sunlight irradiance.

9. A system as in claim 1 wherein the enclosure's temperature and the desiccant's temperature decrease during night time without sunlight irradiance.

10. A system as in claim 1 wherein the system provides a plurality of liquid ejecting cycles, comprising trapping liquid vapor from entering air during night time and releasing trapped liquid vapor to the exterior during day time.

11. A solar harvester comprising:
a solar power harvester disposed within an enclosure with transparent panels, the solar power harvester comprising a solar concentrator for focusing sunlight onto a solar converter,
wherein the enclosure is subjected to a change in sunlight exposure;
a tube having a first end open to a vicinity of a focus of the solar concentrator and a second end open to an exterior of the enclosure;
a desiccant disposed in the enclosure with direct contact to the air in the enclosure and disposed at the first end of the tube so that external air passes through the desiccant before entering the enclosure, the desiccant positioned at a vicinity of a focus of the solar concentrator as to be heated by the concentrated sunlight,
wherein the desiccant directly traps liquid vapor within the enclosure, and
wherein the desiccant traps liquid vapor from the air entering the enclosure and releases trapped liquid vapor to the exterior of the enclosure in response to the change in sunlight exposure.

12. A system as in claim 11 wherein the desiccant is disposed in a container designed to absorb sunlight irradiance.

13. A system as in claim 11 wherein the desiccant comprises silica gel, lithium chloride, lithium bromide, activated alumina, titanium silicate, or molecular sieve.

14. A system as in claim 11 further comprising a filter disposed in the communication path of the desiccant with the interior or exterior of the enclosure.

15. A system as in claim 11
wherein a pressure difference between the interior and the exterior of the enclosure controls the flow to or from the enclosure through the desiccant, and
wherein the pressure difference is generated by the changes in temperature of the interior air in response to sunlight exposure.

16. A system as in claim 11 wherein the heated desiccant releases the liquid vapor to the exterior of the enclosure during the morning when the enclosure is sun-heated and the interior air expands.

17. A system as in claim 11 wherein the cooled desiccant traps the liquid vapor from the air entering the enclosure during the evening when the enclosure is cooled down and the interior air contracts.

18. A system as in claim 11 further comprising a heliostat to focus the solar irradiance and wherein the desiccant is disposed adjacent or in the focus of the heliostat.

19. A method for keeping a green-house enclosure substantially free from liquid vapor, the green-house enclosure subjected to a change in sunlight exposure and comprising a solar concentrator for focusing sunlight onto a solar converter, the method comprising
installing a tube having a first end open to a vicinity of a focus of the solar concentrator and a second end open to an exterior of the enclosure;
installing a desiccant within the enclosure with direct contact to the air in the enclosure and disposed at the first end of the tube so that external air passes through the desiccant before entering the enclosure, the desiccant being cooled at night to adsorb water vapor and heated in the day to drive off the adsorbed water,
wherein the desiccant is positioned at a focus of the solar concentrator as to be heated by the concentrated sunlight,
wherein a change in sunlight exposure generates a change in temperature of the enclosure;
wherein a pressure difference between the interior and the exterior of the enclosure controls the flow to or from the enclosure through the desiccant;
wherein the pressure difference is generated by the changes in temperature of the interior air in response to sunlight exposure;
wherein the desiccant directly traps liquid vapor within the enclosure, and
wherein the desiccant traps liquid vapor from the air entering the enclosure and releases trapped liquid vapor to the exterior of the enclosure to keep the enclosure substantially free from liquid vapor.

20. A method as in claim 19 further comprising
installing a filter in the communication path of the desiccant with the interior or exterior of the enclosure.

* * * * *